(12) United States Patent
Kim

(10) Patent No.: US 11,698,116 B2
(45) Date of Patent: Jul. 11, 2023

(54) BRAKE APPARATUS FOR VEHICLE

(71) Applicant: HYUNDAI MOBIS CO., LTD., Seoul (KR)

(72) Inventor: Sang Bum Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 289 days.

(21) Appl. No.: 17/094,216

(22) Filed: Nov. 10, 2020

(65) Prior Publication Data

US 2021/0140501 A1 May 13, 2021

(30) Foreign Application Priority Data

Nov. 12, 2019 (KR) .......................... 10-2019-0144293

(51) Int. Cl.
| | |
|---|---|
| *F16D 55/08* | (2006.01) |
| *F16D 65/18* | (2006.01) |
| *F16D 65/56* | (2006.01) |
| *F16D 125/40* | (2012.01) |
| *F16D 125/06* | (2012.01) |
| *F16D 121/24* | (2012.01) |

(52) U.S. Cl.
CPC ......... *F16D 65/183* (2013.01); *F16D 65/567* (2013.01); *F16D 2121/24* (2013.01); *F16D 2125/06* (2013.01); *F16D 2125/40* (2013.01)

(58) Field of Classification Search
CPC .. F16D 65/183; F16D 65/567; F16D 2121/24; F16D 2125/06; F16D 2125/40
See application file for complete search history.

(56) References Cited

U.S. PATENT DOCUMENTS

| | | | |
|---|---|---|---|
| 10,145,431 B2 * | 12/2018 | Hofschulte | ........... F16D 65/183 |
| 2009/0120744 A1 * | 5/2009 | Tristano | .................. F16D 65/18 |
| | | | 188/265 |
| 2016/0355169 A1 * | 12/2016 | Ohlig | .................... B60T 13/741 |
| 2018/0087590 A1 * | 3/2018 | Chelaidite | ............. F16D 55/226 |

FOREIGN PATENT DOCUMENTS

KR  10-2009-0062629 A1  6/2009

* cited by examiner

*Primary Examiner* — Nicholas J Lane
(74) *Attorney, Agent, or Firm* — NovoTechIP International PLLC

(57) ABSTRACT

A brake apparatus for a vehicle includes a screw bar positioned inside a caliper body, and rotated by receiving power of a driving motor; a nut unit including a nut which surrounds the screw bar, and a nut holder which is threadedly coupled with the screw bar, is movable on the nut and is moved toward a pad member by rotation of the screw bar; and a piston unit surrounding the nut unit, and pressing the pad member, wherein the nut holder is brought into contact with the piston unit while being moved toward the pad member, and moves the nut such that the nut pushes the piston unit.

8 Claims, 12 Drawing Sheets

BRAKE APPARATUS FOR VEHICLE

CROSS-REFERENCE TO RELATED APPLICATION

This application claims priority from and the benefit of Korean Patent Application No. 10-2019-0144293, filed on Nov. 12, 2019, which is hereby incorporated by reference for all purposes as if set forth herein.

BACKGROUND

Field

Exemplary embodiments of the present disclosure relate to a brake apparatus for a vehicle, and more particularly, to a brake apparatus for a vehicle, which can be applied to various specifications of piston units due to the common use of a nut unit.

Discussion of the Background

In general, an electronic parking brake (EPB) of an automobile converts the rotational force of a driving motor into a linear motion using a screw and nut mechanism, thereby pushing a piston. As the pushed piston presses a brake pad, which is a friction material, against a wheel disc, a braking force is generated.

A new specification of the piston may be induced attributable to a size variation due to a change in the size and thickness of a brake disc, and a nut should be fabricated in conformity with the new specification of the piston. Therefore, a problem may be caused in that a manufacturing cost is incurred continuously. Therefore, there is a need to solve such a problem.

A background art of the present disclosure is disclosed in Korean Patent Application Publication No. 10-2009-0062629 (published on Jun. 17, 2009 and entitled "Caliper Type Electronic Parking Brake").

SUMMARY

Various embodiments are directed to a brake apparatus for a vehicle, which can be applied to various specifications of caliper pistons due to the common use of a nut unit.

In an embodiment, a brake apparatus for a vehicle may include: a screw bar positioned inside a caliper body, and rotated by receiving power of a driving motor; a nut unit including a nut which surrounds the screw bar, and a nut holder which is threadedly coupled with the screw bar, is movable on the nut and is moved toward a pad member by rotation of the screw bar; and a piston unit surrounding the nut unit, and pressing the pad member, wherein the nut holder is brought into contact with the piston unit while being moved toward the pad member, and moves the nut such that the nut pushes the piston unit.

The nut holder may include: a moving block threadedly coupled with the screw bar, and moved on the nut; and a contact module section rotatably coupled to the moving block, moved together with the moving block, and brought into contact with the piston unit while being moved toward the pad member.

The nut may include a nut body including a nut body section which is formed with a movement guide portion for guiding movement of the moving block.

The nut may further include a nut head which is connected with the nut body, has a size larger than that of the nut body and comes into contact with the contact module section.

The nut body may further include a contact guide section which guides the contact module section to be brought into contact with the piston unit.

The contact guide section may connect the nut body section and the nut head, and a width of the contact guide section may increase from the nut body section toward the nut head.

A plurality of movement guide portions may be formed in the nut body section along a circumference; and a plurality of contact module sections may be disposed in the movement guide portions, respectively, and an interval between the contact module sections may be expanded upon contact with the contact guide section such that the contact module sections are brought into contact with the piston unit.

The contact module section may include: a rotation bar rotatably installed on the moving block, and moved together with the moving block; and a contact block coupled to the rotation bar, and brought into contact with the contact guide section.

The brake apparatus for a vehicle according to the present disclosure may cope with a situation where the size of a piston unit varies according to various specifications of brake calipers, with only one nut unit through a nut holder brought into contact with the piston unit when being moved toward a pad member. As a consequence, since the common use of the nut unit is possible, the brake apparatus for a vehicle according to the present disclosure may be applied to various specifications of piston units.

Also, in the brake apparatus for a vehicle according to the present disclosure, when contact module sections move toward the pad member through a contact guide section of a nut body, an interval between the contact module sections is expanded so as to conform to a size of the piston unit, and thus, the contact module sections are brought into contact with the piston unit. As a consequence, it is possible to easily move the piston unit toward the pad member.

Further, in the brake apparatus for a vehicle according to the present disclosure, since the contact guide section has a shape in which a width of the contact guide section increases from a nut body section toward a nut head, depending on a rotation direction of a screw bar, the interval between the contact module sections may be expanded such that the contact module sections are brought into contact with the piston unit, or an interval between the contact module sections and a moving block may be decreased such that the contact module sections are not brought into contact with the piston unit.

DETAILED DESCRIPTION OF THE ILLUSTRATED EMBODIMENTS

Hereinbelow, a brake apparatus for a vehicle in accordance with an embodiment of the present disclosure will be described with reference to attached drawings.

It should be noted that the drawings are not to precise scale and may be exaggerated in thicknesses of lines or sizes of components for descriptive convenience and clarity only. Furthermore, the terms used herein are defined by taking functions of the disclosure into account and can be changed according to the intention of users or operators or the practice. Therefore, definition of the terms should be made according to the overall disclosure set forth herein.

Figure 1:
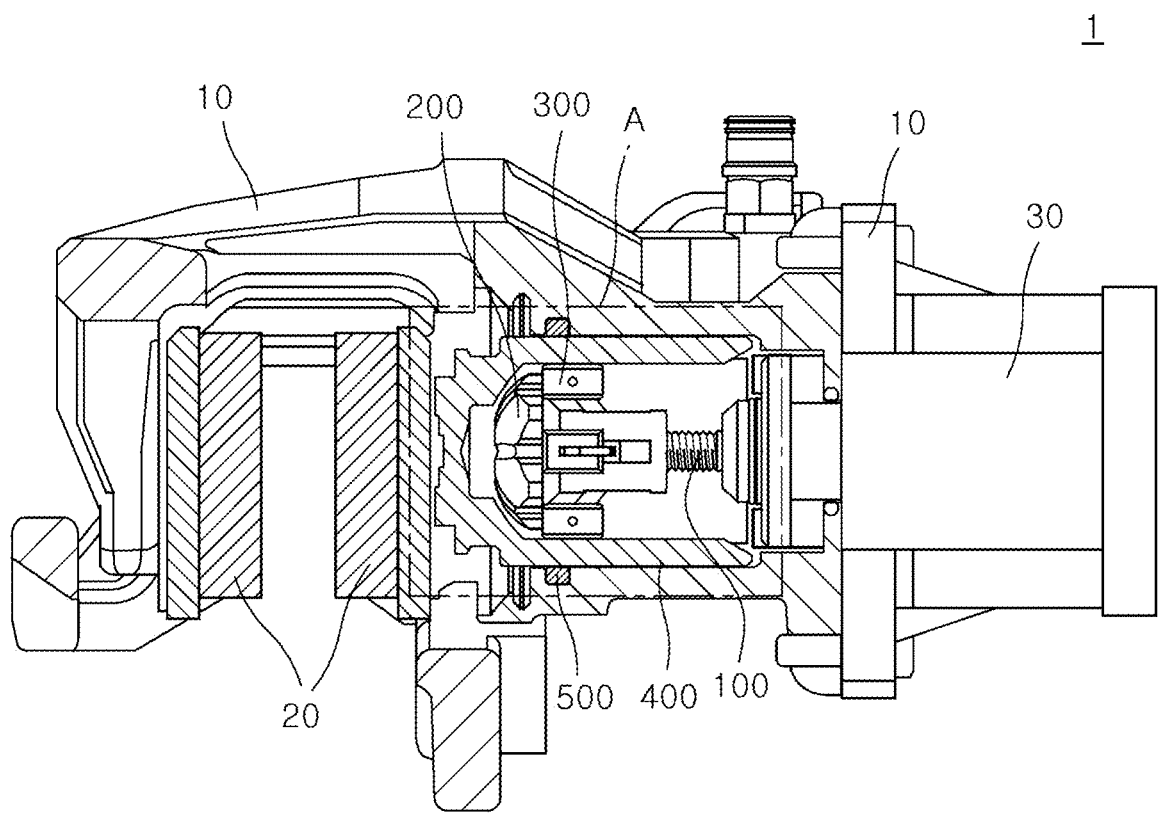
FIG. 1 is a view schematically illustrating the structure of a brake apparatus for a vehicle in accordance with an embodiment of the present disclosure.
Figure 2:
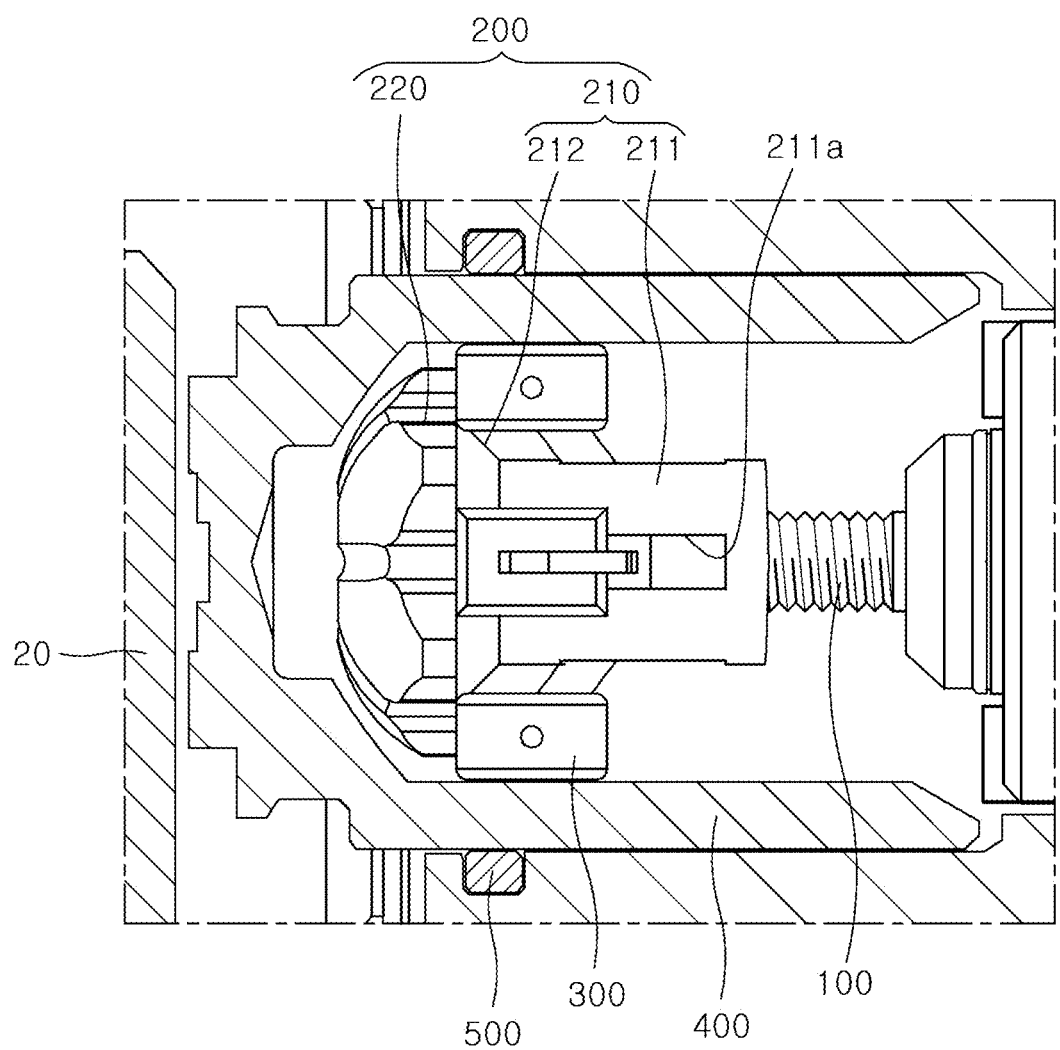
FIG. 2 is an enlarged view of a part A of FIG. 1.
Figure 3:
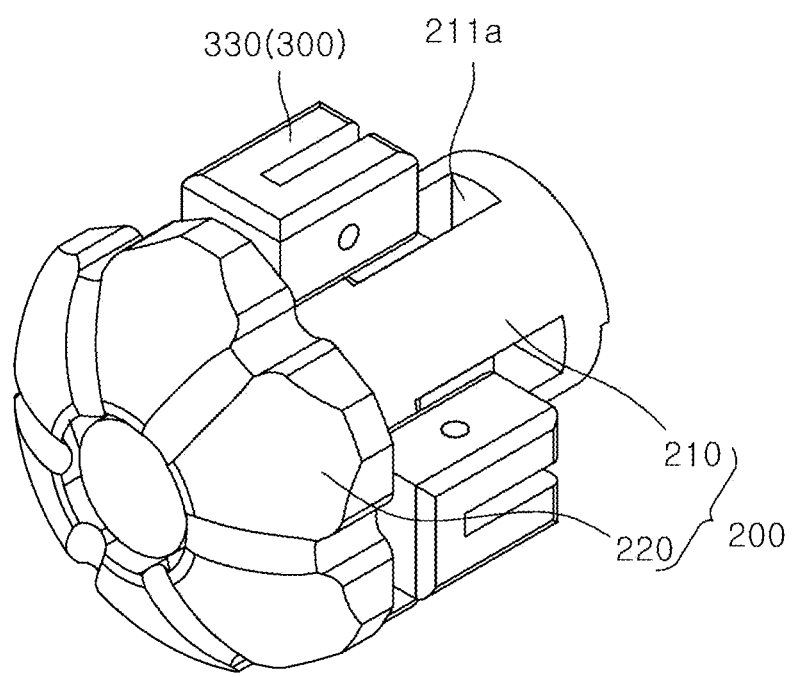
FIG. 3 is a perspective view illustrating a nut and a nut holder of the brake apparatus for a vehicle in accordance with the embodiment of the present disclosure.
Figure 4:
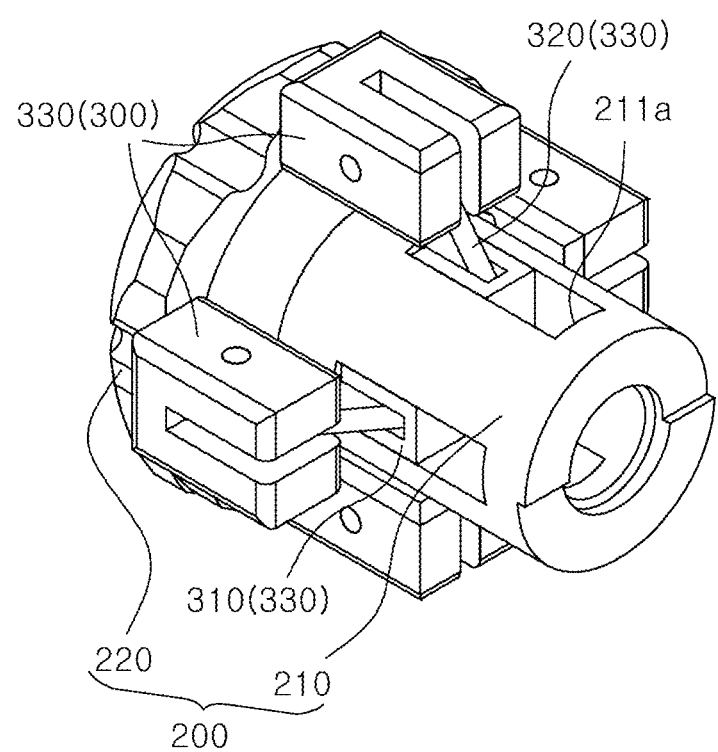
FIG. 4 is a perspective view illustrating the nut and the nut holder, viewed in a different direction, of the brake apparatus for a vehicle in accordance with the embodiment of the present disclosure.
Figure 5:
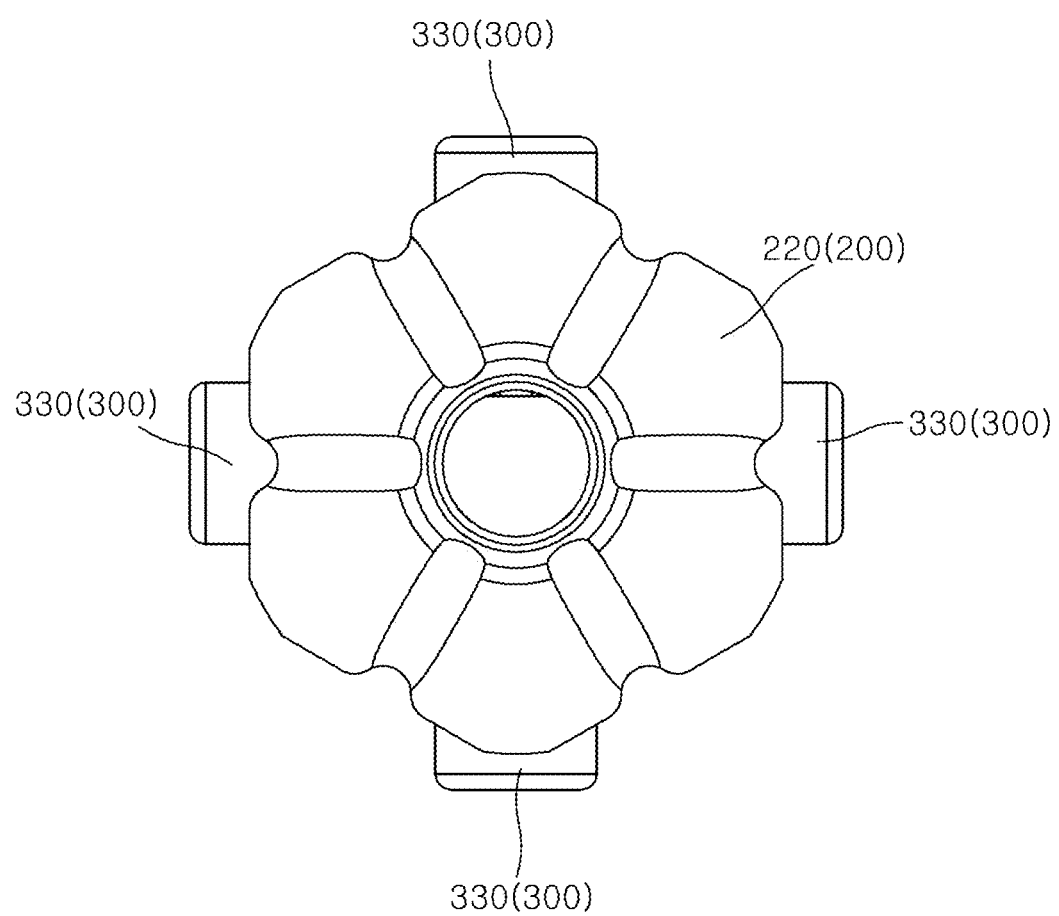
FIG. 5 is a front view illustrating the nut and the nut holder of the brake apparatus for a vehicle in accordance with the embodiment of the present disclosure.
Figure 6:
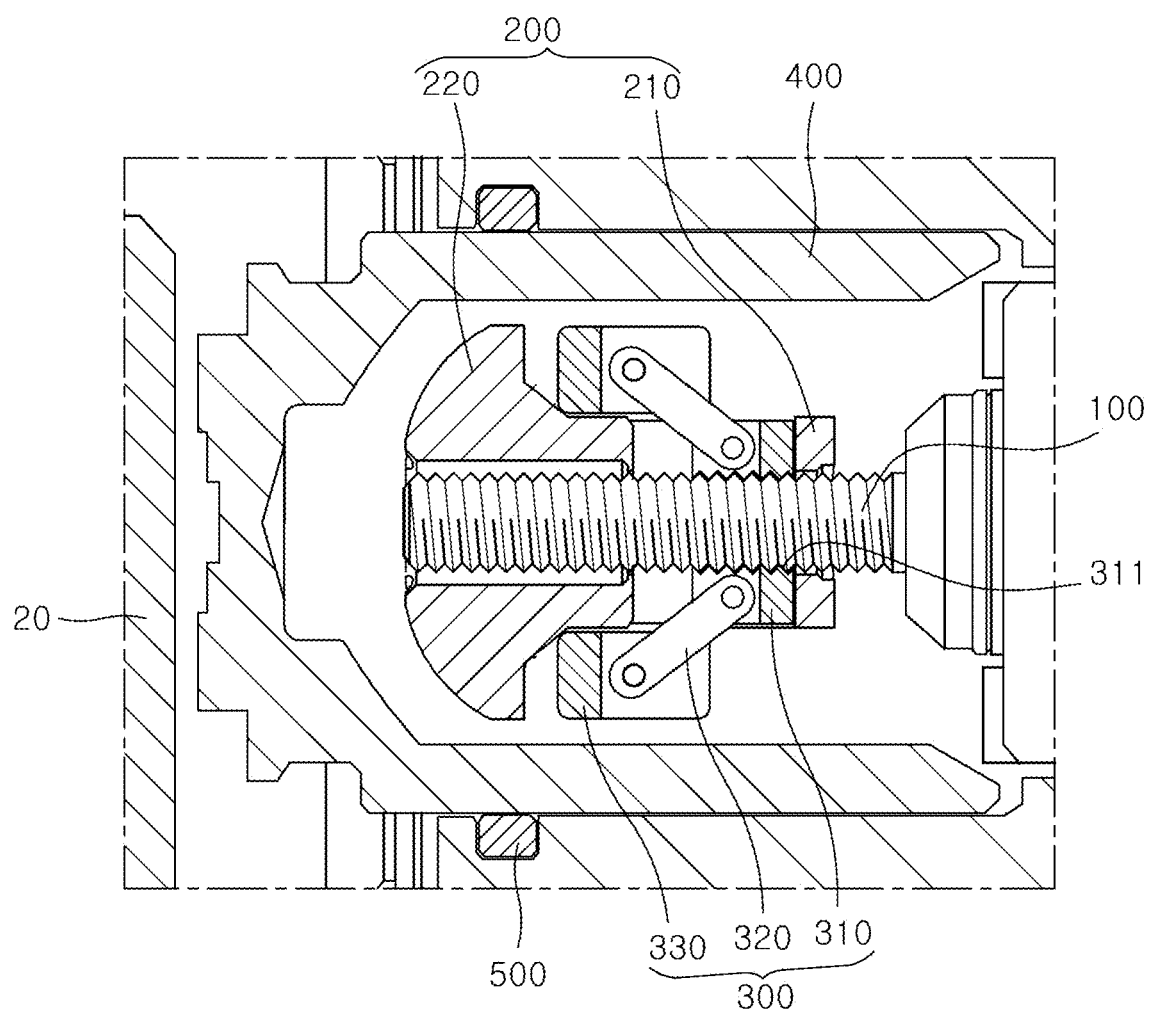
FIG. 6 is a cross-sectional view illustrating a main part of the brake apparatus for a vehicle in accordance with the embodiment of the present disclosure.
Figure 7:
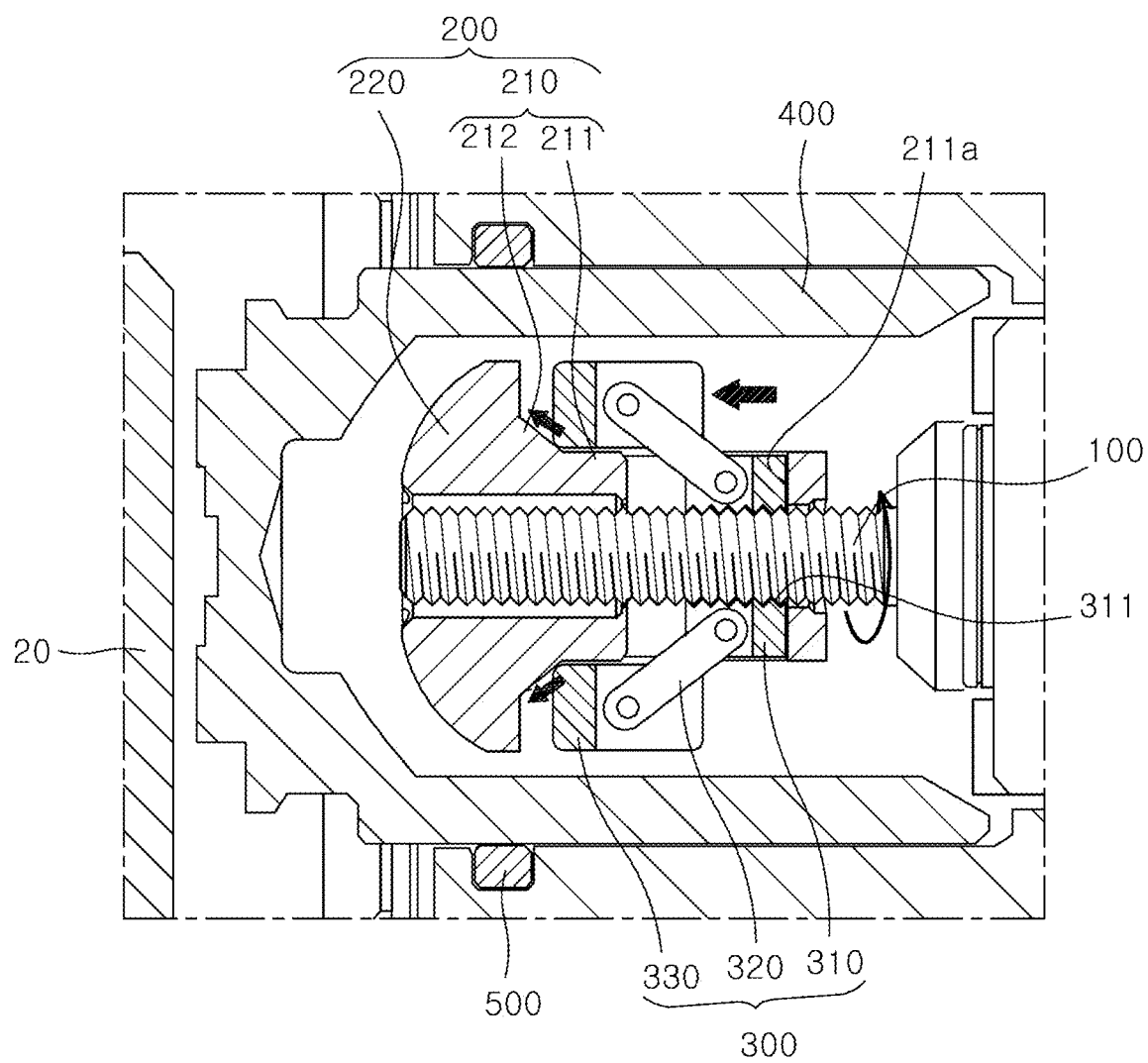
FIG. 7 is a view illustrating a state in which the nut holder of the brake apparatus for a vehicle in accordance with the embodiment of the present disclosure is moved toward a pad member.
Figure 8:
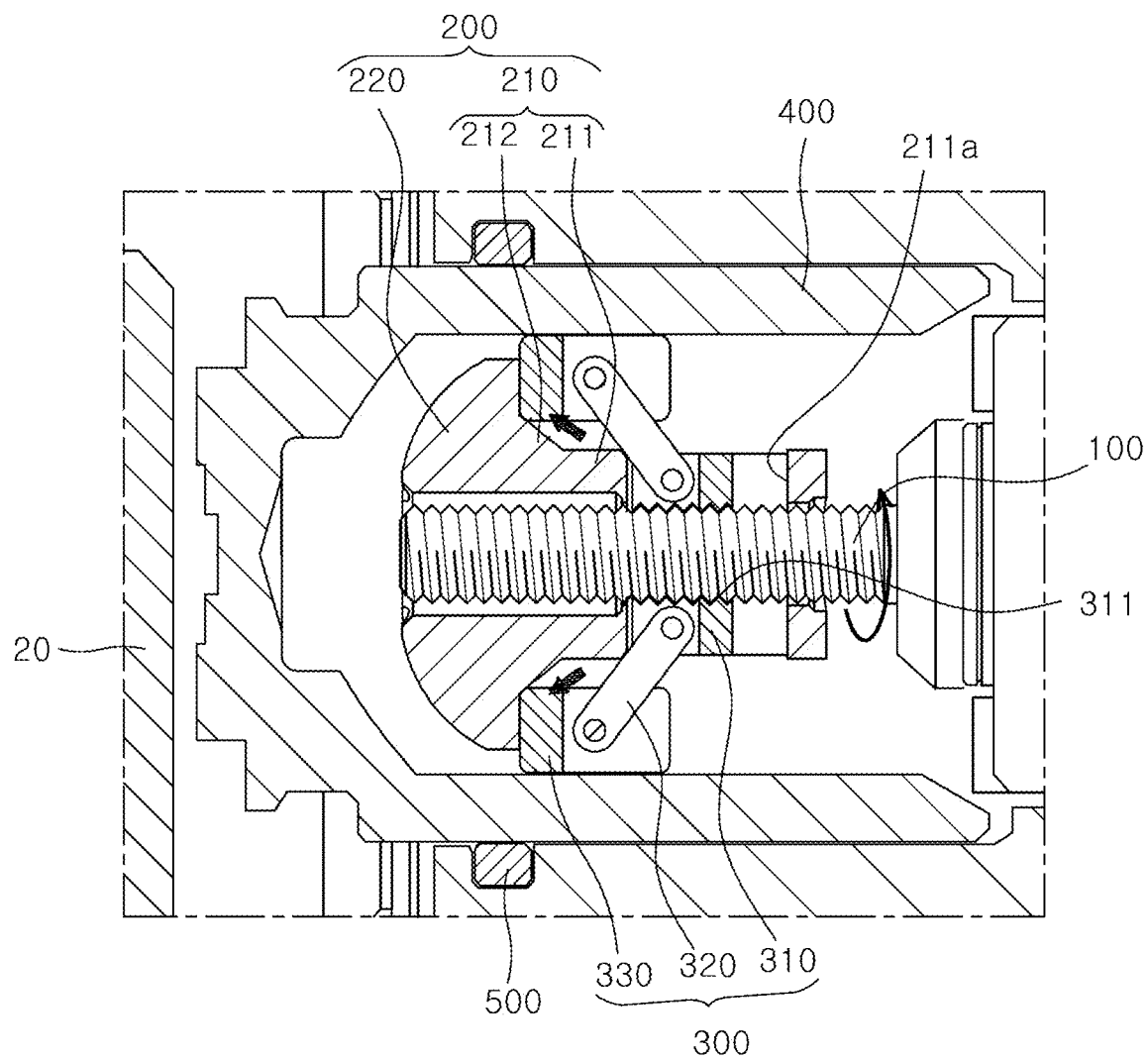
FIG. 8 is a view illustrating a state in which, when the nut holder of the brake apparatus for a vehicle in accordance with the embodiment of the present disclosure is moved by at least a predetermined distance toward the pad member, the nut holder is brought into contact with the nut and moves the nut.
Figure 9:
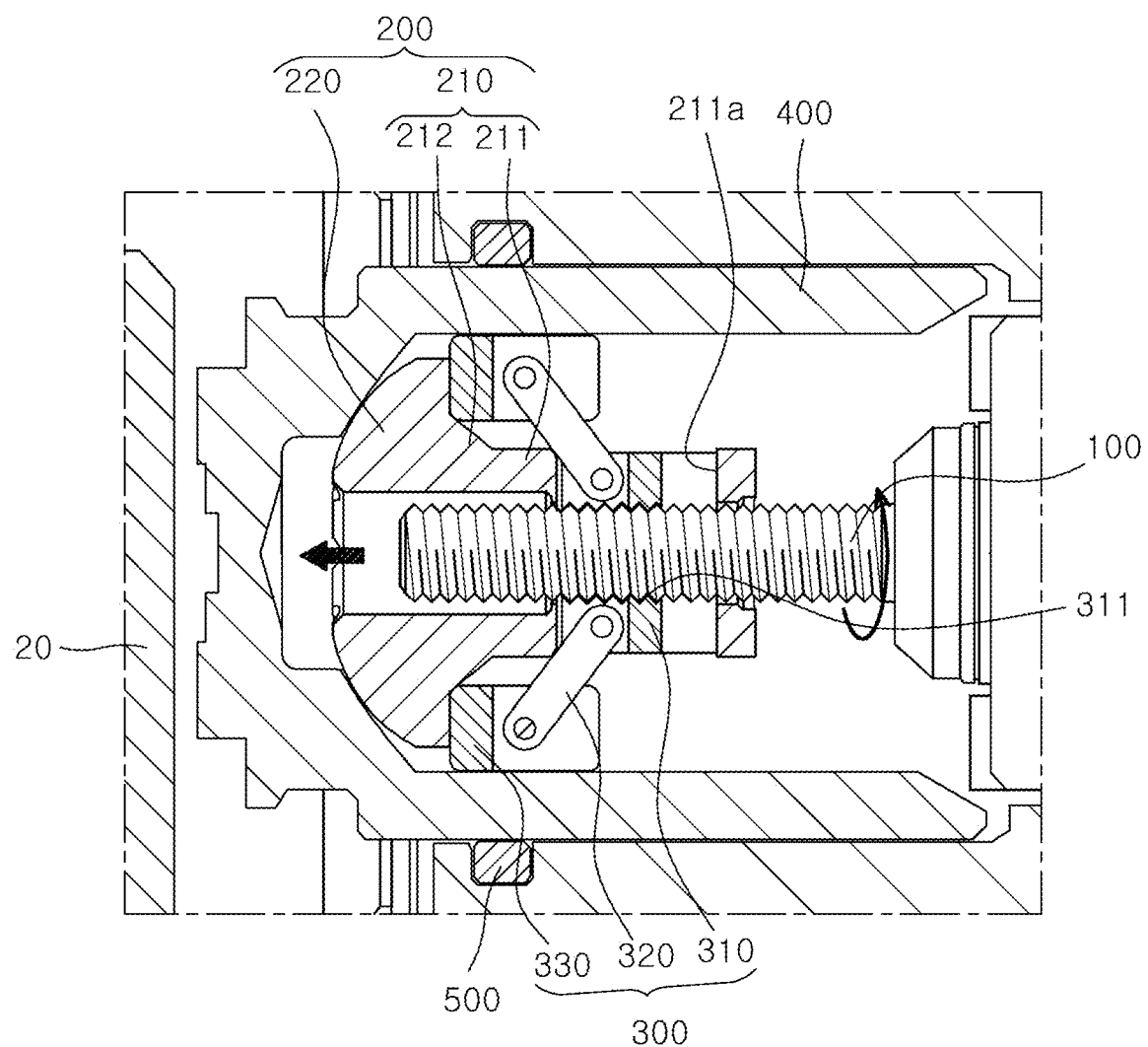
FIG. 9 is a view illustrating a state in which the nut of the brake apparatus for a vehicle in accordance with the embodiment of the present disclosure pushes and moves a piston unit.
Figure 10:
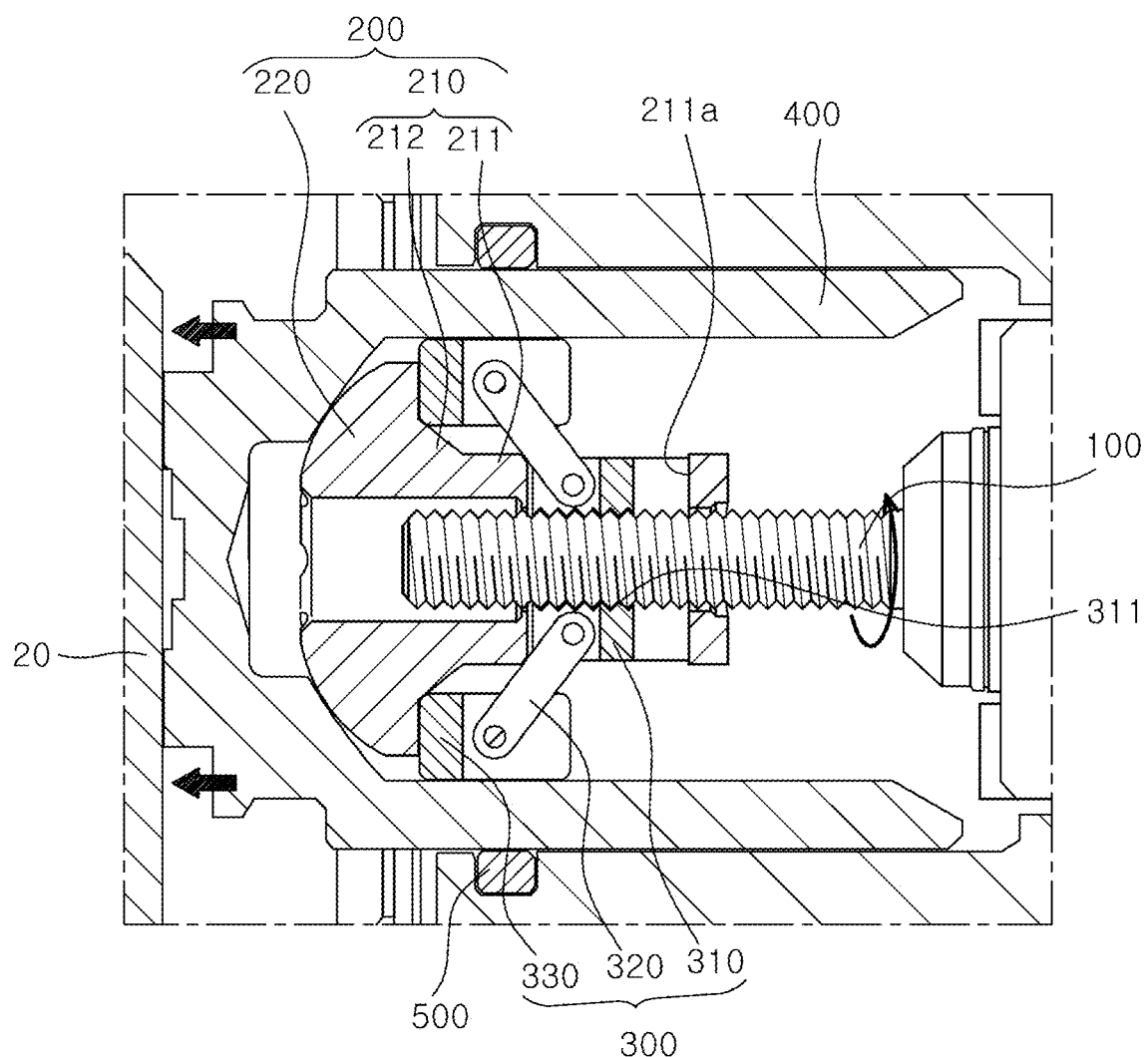
FIG. 10 is a view illustrating a state in which the piston unit of the brake apparatus for a vehicle in accordance with the embodiment of the present disclosure presses the pad member.
Figure 11:
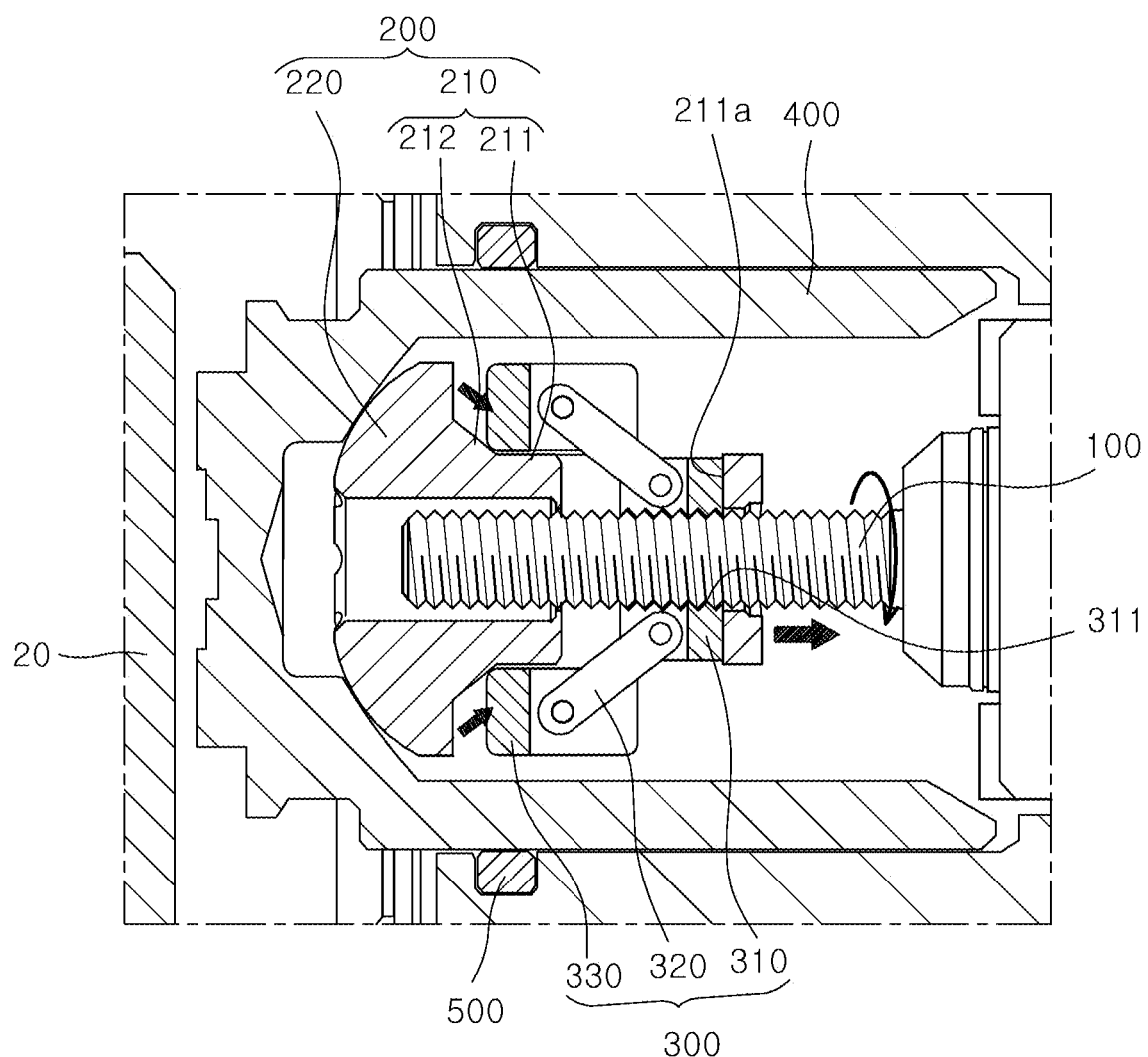
FIG. 11 is a view illustrating a state in which the nut holder of the brake apparatus for a vehicle in accordance with the embodiment of the present disclosure is moved away from the pad member.
Figure 12:
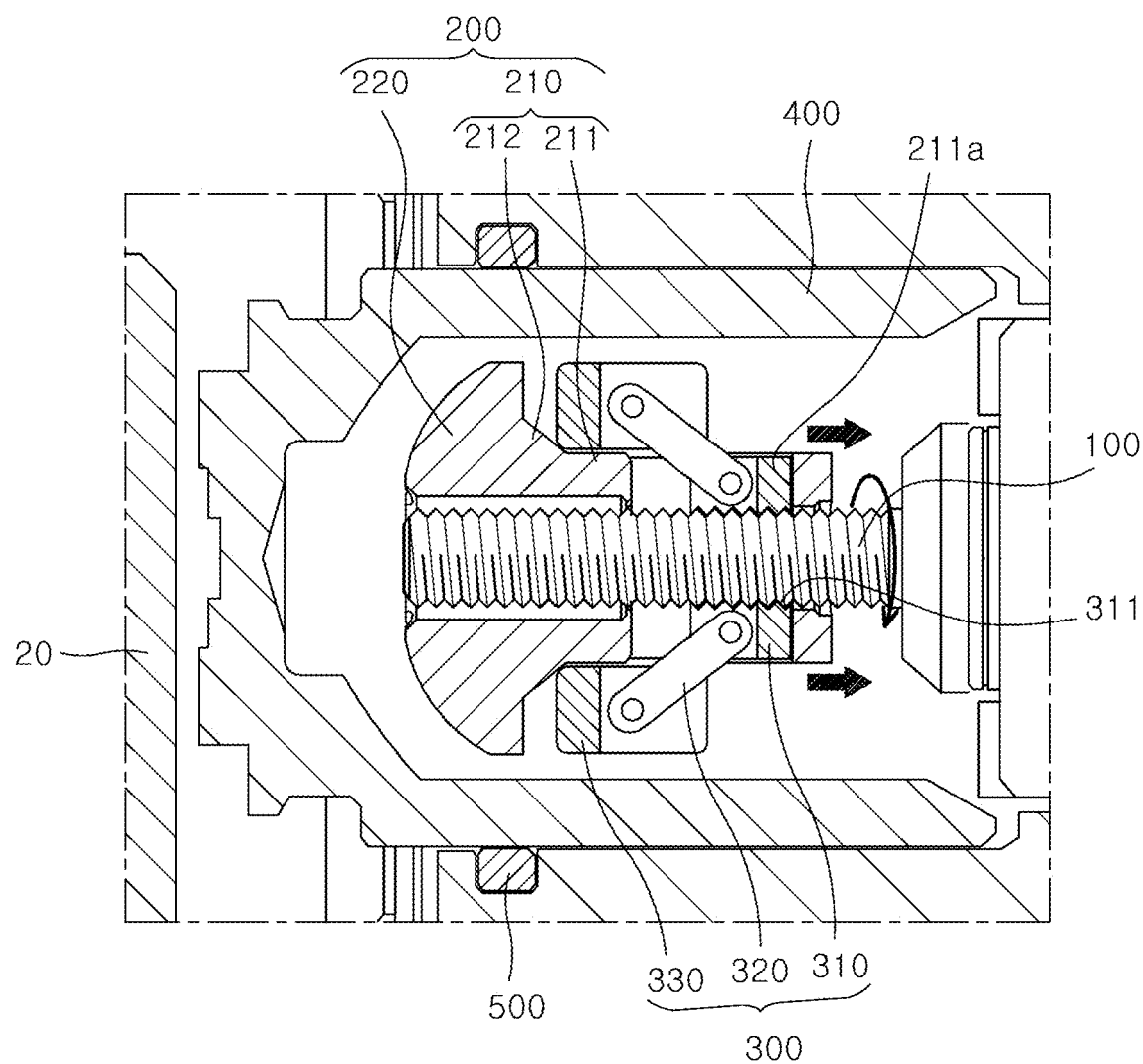
FIG. 12 is a view illustrating a state in which the piston unit of the brake apparatus for a vehicle in accordance with the embodiment of the present disclosure is released from pressing the pad member.

FIG. 1 is a view schematically illustrating the structure of a brake apparatus for a vehicle in accordance with an embodiment of the present disclosure, FIG. 2 is an enlarged view of a part A of FIG. 1, FIG. 3 is a perspective view illustrating a nut and a nut holder of the brake apparatus for a vehicle in accordance with the embodiment of the present disclosure, FIG. 4 is a perspective view illustrating the nut and the nut holder, viewed in a different direction, of the brake apparatus for a vehicle in accordance with the embodiment of the present disclosure, FIG. 5 is a front view illustrating the nut and the nut holder of the brake apparatus for a vehicle in accordance with the embodiment of the present disclosure, FIG. 6 is a cross-sectional view illustrating a main part of the brake apparatus for a vehicle in accordance with the embodiment of the present disclosure, FIG. 7 is a view illustrating a state in which the nut holder of the brake apparatus for a vehicle in accordance with the embodiment of the present disclosure is moved toward a pad member, FIG. 8 is a view illustrating a state in which, when the nut holder of the brake apparatus for a vehicle in accordance with the embodiment of the present disclosure is moved at least a predetermined distance toward the pad member, the nut holder is brought into contact with the nut and moves the nut, FIG. 9 is a view illustrating a state in which the nut of the brake apparatus for a vehicle in accordance with the embodiment of the present disclosure pushes and moves a piston unit, FIG. 10 is a view illustrating a state in which the piston unit of the brake apparatus for a vehicle in accordance with the embodiment of the present disclosure presses the pad member, FIG. 11 is a view illustrating a state in which the nut holder of the brake apparatus for a vehicle in accordance with the embodiment of the present disclosure is moved away from the pad member, and FIG. 12 is a view illustrating a state in which the piston unit of the brake apparatus for a vehicle in accordance with the embodiment of the present disclosure is released from pressing the pad member.

Referring to FIGS. 1 to 5, the brake apparatus 1 for a vehicle in accordance with the embodiment of the present disclosure includes a screw bar 100, a nut unit 200 and 300, a piston unit 400, and a sealing unit 500.

The screw bar 100 is positioned inside a caliper body 10, and is rotated by receiving the power of a driving motor 30. The screw bar 100, which has a rod shape, is inserted into a nut 200, and is formed with a male thread (not numbered) on the outer surface thereof.

The nut unit 200 and 300 includes the nut 200 and a nut holder 300. The nut 200 surrounds the screw bar 100. The nut 200 has an insertion hole (not numbered) into which the screw bar 100 is inserted.

The nut holder 300 is threadedly coupled with the screw bar 100, is movable on the nut 200, and is moved toward a pad member 20 by the rotation of the screw bar 100. The nut holder 300 has a female thread 311 which is threadedly coupled with the male thread of the screw bar 100, and is restrained in rotation by the screw bar 100. The nut holder 300 may be moved in left and right directions (based on FIG. 2) depending on a rotation direction of the screw bar 100.

When the nut holder 300 moves toward the pad member 20, the nut holder 300 is brought into contact with the piston unit 400, and moves the nut 200 such that the nut 200 pushes the piston unit 400.

The piston unit 400 surrounds the nut unit 200 and 300, and presses the pad member 20. The piston unit 400 is formed in a cylindrical shape. One end of the piston unit 400, through which the nut unit 200 and 300 is inserted, is open, and the other end of the piston unit 400, which faces the pad member 20, is closed.

The piston unit 400 is installed to surround the nut unit 200 and 300, and presses the pad member 20 by being moved together with the nut unit 200 and 300. In detail, when the nut 200 pushes the piston unit 400, the piston unit 400 presses the pad member 20, and as the pad member 20 is pressed against a wheel disc (not illustrated), a braking force is generated.

The sealing unit 500 is installed on the caliper body 10, and is in contact with the piston unit 400. The sealing unit 500, which has a ring shape, is installed on an inside of the caliper body 10 which faces the piston unit 400, and is in close contact with the piston unit 400.

The nut holder 300 includes a moving block 310 and a contact module section 320 and 330. The moving block 310 is threadedly coupled with the screw bar 100, and is moved on the screw bar 100. The moving block 310, which has a ring shape, surrounds the outer surface of the screw bar 100. The moving block 310 is formed, on the inner surface thereof, with the female thread 311 which is threadedly coupled with the male thread of the screw bar 100. The moving block 310 is moved toward the pad member 20 or away from the pad member 20 while being rotated, depending on a rotation direction of the screw bar 100. The moving block 310 is moved along a movement guide portion 211*a* of the nut 200.

The contact module section 320 and 330 is rotatably coupled to the moving block 310, and is moved together with the moving block 310. When the contact module section 320 and 330 moves toward the pad member 20, the contact module section 320 and 330 is brought into contact with the piston unit 400 (see FIGS. 6 to 10). Conversely, when the contact module section 320 and 330 moves away from the pad member 20, the contact module section 320 and 330 is not brought into contact with the piston unit 400 (see FIGS. 11 and 12).

The nut 200 includes a nut body 210 and a nut head 220. The nut body 210 includes a nut body section 211 and a contact guide section 212. The nut body section 211, which has a circular column shape, includes the movement guide portion 211*a* which guides the movement of the moving block 310. The movement guide portion 211*a*, which has a slot shape, is formed to be long in a lengthwise direction, that is, a left-right direction, of the nut body section 211 (see FIG. 6).

The contact guide section 212 guides the contact module section 320 and 330 to be brought into contact with the piston unit 400. When contact module sections 320 and 330 move toward the pad member 20 on the contact guide section 212, the interval between the contact module sections 320 and 330 is expanded. Conversely, when the contact module sections 320 and 330 move away from the pad member 20 on the contact guide section 212, the interval between the contact module sections 320 and 330 is reduced.

The contact guide section 212 connects the nut body section 211 and the nut head 220, and a width thereof increases from the nut body section 211 toward the nut head 220. By this fact, in the case where the contact module sections 320 and 330 are moved toward the pad member 20 in a state in which the contact module sections 320 and 330 are brought into contact with the contact guide section 212, the interval between the contact module sections 320 and 330 may be expanded, and thereby, the contact module sections 320 and 330 may be brought into contact with the piston unit 400. Also, in the case where the contact module sections 320 and 330 are moved away from the pad member 20 in a state in which the contact module sections 320 and 330 are brought into contact with the contact guide section 212, the interval between the contact module sections 320 and 330 may be reduced, and thereby, the contact module sections 320 and 330 may not be brought into contact with the piston unit 400.

The contact module sections 320 and 330 come into contact with the nut head 220 in a state in which the interval between the contact module sections 320 and 330 is expanded by the contact guide section 212, and push the nut head 220 as the contact module sections 320 and 330 are moved toward the pad member 20 by the rotation of the screw bar 100. Accordingly, the nut 200 may be moved toward the pad member 20 together with the contact module sections 320 and 330, and thereby, may push the piston unit 400 and move the piston unit 400 toward the pad member 20.

The nut head 220 is connected with the nut body 210, and has a size larger than that of the nut body 210. The contact module sections 320 and 330 may come into contact with the nut head 220. When the contact module sections 320 and 330 come into contact with the nut head 220, the contact module sections 320 and 330 push the nut head 220 in a state in which the radially outward movement of the contact module sections 320 and 330 is blocked as the contact module sections 320 and 330 are brought into contact with the piston unit 400. Thus, the nut 200 may be moved toward the pad member 20 together with the nut holder 300. Thereafter, the nut head 220 pushes the piston unit 400.

The surface of the nut head 220 which comes into contact with the piston unit 400 has a rounded shape, and the surface of the piston unit 400 which comes into contact with the nut head 220 has a rounded shape corresponding to the rounded shape of the nut head 220. Through this, deformation of the nut head 220 upon contact with the piston unit 400 may be minimized.

A plurality of movement guide portions 211*a* are formed along the circumference of the nut body section 211. The movement guide portions 211*a* are formed in the nut body section 211 to be spaced apart at regular intervals in a circumferential direction.

The plurality of contact module sections 320 and 330 are rotatably coupled to the moving block 310, and are disposed in the movement guide portions 211*a*, respectively. The contact module sections 320 and 330 are disposed to be spaced apart at the same interval as the movement guide portions 211*a*. Through this, in the case where the contact module sections 320 and 330 are brought into contact with the piston unit 400 by being moved toward the pad member 20, the contact module sections 320 and 330 together with the nut head 220 may push the piston unit 400, thereby easily moving the piston unit 400 toward the pad member 20.

The contact module section 320 and 330 includes a rotation bar 320 and a contact block 330. The rotation bar 320 is rotatably installed on the moving block 310, and is moved together with the moving block 310. One end of the rotation bar 320 is rotatably coupled to the moving block 310, and the other end of the rotation bar 320 is rotatably coupled to the contact block 330.

The contact block 330 is coupled to the rotation bar 320, and is brought into contact with the contact guide section 212. In the case where the contact blocks 330 are moved toward the pad member 20 in a state in which the contact blocks 330 are brought into contact with the contact guide section 212, the interval between the contact blocks 330 may be expanded while the contact blocks 330 are rotated together with the rotation bars 320, and thereby, the contact blocks 330 may be brought into contact with the piston unit 400. Conversely, in the case where the contact blocks 330 are moved away from the pad member 20 in a state in which the contact blocks 330 are brought into contact with the contact guide section 212, the interval between the contact blocks 330 may be reduced while the contact blocks 330 are rotated together with the rotation bars 320, and thereby, the contact blocks 330 may not be brought into contact with the piston unit 400.

Hereinafter, the operation and effects of the brake apparatus 1 for a vehicle in accordance with the embodiment of the present disclosure will be described with reference to FIGS. 6 to 12.

As illustrated in FIGS. 6 to 10, in the case where a braking force is to be generated by the brake apparatus 1 for a vehicle, the screw bar 100 which receives the power of the driving motor 30 is rotated in a predetermined direction, and the nut holder 300 which is threadedly coupled with the screw bar 100 is moved toward the pad member 20. The nut holder 300 is brought into contact with the piston unit 400 while being moved toward the pad member 20, and the nut 200 is moved toward the pad member 20 by being pushed by the nut holder 300. Thereafter, the nut 200 is moved toward the pad member 20 together with the nut holder 300, pushes the piston unit 400, and thereby, moves the piston unit 400 toward the pad member 20 to press the pad member 20.

In detail, the moving block 310 of the nut holder 300 is moved toward the pad member 20 along the movement guide portions 211*a* of the nut 200, by the rotation of the screw bar 100. The contact module sections 320 and 330 of the nut holder 300 are moved toward the pad member 20 in a state in which they are brought into contact with the contact guide section 212 of the nut 200, and are brought into contact with the piston unit 400 as the interval between them is expanded. At the same time, the contact module sections 320 and 330 push the nut 200, and thereby, move the nut 200 toward the pad member 20. As the nut 200 is moved toward the pad member 20, the nut 200 pushes the piston unit 400, and thereby, moves the piston unit 400 toward the pad member 20. As the piston unit 400 is moved toward the pad member 20, the piston unit 400 presses the pad member 20.

As illustrated in FIGS. 11 and 12, in the case where a braking force is to be released, the screw bar 100 is reversely rotated, that is, the screw bar 100 is rotated in a direction opposite to the predetermined direction, and the nut holder 300 threadedly coupled with the screw bar 100 is moved away from the pad member 20. If the nut holder 300 is moved away from the pad member 20, as the pushing of the nut holder 300 and the nut 200 is released, the piston unit 400 is detached from the pad member 20. That is to say, the piston unit 400 is moved away from the pad member 20.

In detail, the moving block 310 of the nut holder 300 is moved away from the pad member 20 along the movement guide portions 211*a* of the nut 200, by the reverse rotation of the screw bar 100. While the contact module sections 320 and 330 of the nut holder 300 are moved away from the pad member 20 in a state in which they are brought into contact with the contact guide section 212 of the nut 200, the interval between the contact module sections 320 and 330 is reduced and the contact module sections 320 and 330 are not brought into contact with the piston unit 400. As the contact module sections 320 and 330 of the nut holder 300 are moved away from the pad member 20, the nut 200 and the piston unit 400 are moved away from the pad member 20. At the same time, the pushing of the nut 200 and the piston unit 400 is released, and the piston unit 400 is detached from the pad member 20.

As is apparent from the above description, the brake apparatus 1 for a vehicle in accordance with the embodiment of the present disclosure may cope with a situation where the size of the piston unit 400 varies according to various specifications of brake calipers (not illustrated), with only one nut unit 200 and 300 through the nut holder 300 which is brought into contact with the piston unit 400 when being moved toward the pad member 20. As a result, since the common use of the nut unit 200 and 300 is possible, the brake apparatus 1 for a vehicle in accordance with the embodiment of the present disclosure may be applied to various specifications of piston units 400.

Although the present disclosure has been disclosed with reference to the embodiments illustrated in the drawings, the embodiments are only for illustrative purposes, and those skilled in the art will appreciate that various modifications and other equivalent embodiments are possible, without departing from the scope and spirit of the present disclosure as defined in the accompanying claims.

Thus, the true technical scope of the present disclosure should be defined by the following claims.

What is claimed is:

1. A brake apparatus for a vehicle, comprising:
a screw bar connected to a driving motor and configured to rotate based on a rotary power from the driving motor;
a nut unit configured to move toward a pad member in response to a rotation of the screw bar, the nut unit including:
a nut surrounding the screw bar; and
a nut holder threaded to the screw bar and configured to move toward the pad member by the rotation of the screw bar; and
a piston unit having an inner surface surrounding the nut unit and configured to press the pad member when pushed by the nut unit toward the pad member,
wherein the nut holder is spaced apart from the inner surface of the piston when the screw bar is not rotated, and
wherein the nut is configured, when the nut holder moves toward the pad member by the rotation of the screw bar, to push the nut holder toward the inner surface of the piston unit such that the nut holder contacts the inner surface of the piston.

2. A brake apparatus for a vehicle, comprising:
a screw bar positioned inside a caliper body, and rotated by receiving power of a driving motor;
a nut unit including a nut which surrounds the screw bar, and a nut holder which is threaded to the screw bar, is movable on the nut and is moved toward a pad member by rotation of the screw bar; and
a piston unit surrounding the nut unit, and pressing the pad member,
wherein the nut holder is brought into contact with the piston unit while being moved toward the pad member, and moves the nut such that the nut pushes the piston unit, and
wherein the nut holder comprises:
a moving block threaded to the screw bar, and moved on the nut; and
a contact module section rotatably coupled to the moving block, moved together with the moving block, and brought into contact with the piston unit while being moved toward the pad member.

3. The brake apparatus according to claim 2, wherein the nut comprises a nut body including a nut body section which is formed with a movement guide portion for guiding movement of the moving block.

4. The brake apparatus according to claim 3, wherein the nut further comprises a nut head which is connected with the nut body, has a size larger than that of the nut body and comes into contact with the contact module section.

5. The brake apparatus according to claim 4, wherein the nut body further includes a contact guide section which guides the contact module section to be brought into contact with the piston unit.

6. The brake apparatus according to claim 5, wherein the contact guide section connects the nut body section and the nut head, and a width of the contact guide section increases from the nut body section toward the nut head.

7. The brake apparatus according to claim 6, wherein
a plurality of movement guide portions are formed in the nut body section along a circumference, and
a plurality of contact module sections are disposed in the movement guide portions, respectively, and an interval between the contact module sections is expanded upon contact with the contact guide section such that the contact module sections are brought into contact with the piston unit.

8. The brake apparatus according to claim 7, wherein the contact module section comprises:
   a rotation bar rotatably installed on the moving block, and moved together with the moving block; and
   a contact block coupled to the rotation bar, and brought into contact with the contact guide section.

\* \* \* \* \*